United States Patent [19]

Yang et al.

[11] Patent Number: 4,516,874
[45] Date of Patent: May 14, 1985

[54] CHANNEL CONNECTOR

[75] Inventors: James H. C. Yang, Cleveland; Walter Tomaszewski, Canton, both of Ohio

[73] Assignee: The Firestone Tire & Rubber Company, Akron, Ohio

[21] Appl. No.: 602,871

[22] Filed: Apr. 23, 1984

[51] Int. Cl.³ .............................................. F16B 2/02
[52] U.S. Cl. .................................... 403/313; 403/363
[58] Field of Search .............. 403/309, 313, 314, 306, 403/300, 363, 305, 302

[56] References Cited

U.S. PATENT DOCUMENTS

| | | | |
|---|---|---|---|
| 3,900,269 | 8/1975 | Pavlot | 403/292 |
| 4,140,417 | 2/1979 | Danielsen et al. | 403/406 |
| 4,174,911 | 11/1979 | Maccario et al. | 403/303 |
| 4,412,756 | 11/1983 | Dunwoodie et al. | 403/363 |

FOREIGN PATENT DOCUMENTS 998412  7/1965  United Kingdom ............... 403/313

Primary Examiner—Andrew V. Kundrat
Attorney, Agent, or Firm—Ernst H. Ruf

[57] ABSTRACT

A channel connector for channel members, used in mechanical fastening systems for mechanically securing a flexible sheet relative thereto, each channel member being of generally rectangular form, in transverse cross section, and each channel connector being comprised of a flexible resilient material of a shape generally corresponding to that of the channel members and having bottom, side and top wall portions; transverse spacer means, having opposed sides, on the bottom wall, at about the midpoint of the channel connector axial extent; a channel connector bottom wall having a first aperture of a first predetermined size and shape centered a first predetermined axial distance from one of the spacer means sides and a second aperture of a second predetermined size and shape centered a second predetermined axial distance from the other of the spacer means sides.

12 Claims, 7 Drawing Figures

U.S. Patent May 14, 1985 Sheet 1 of 2 4,516,874
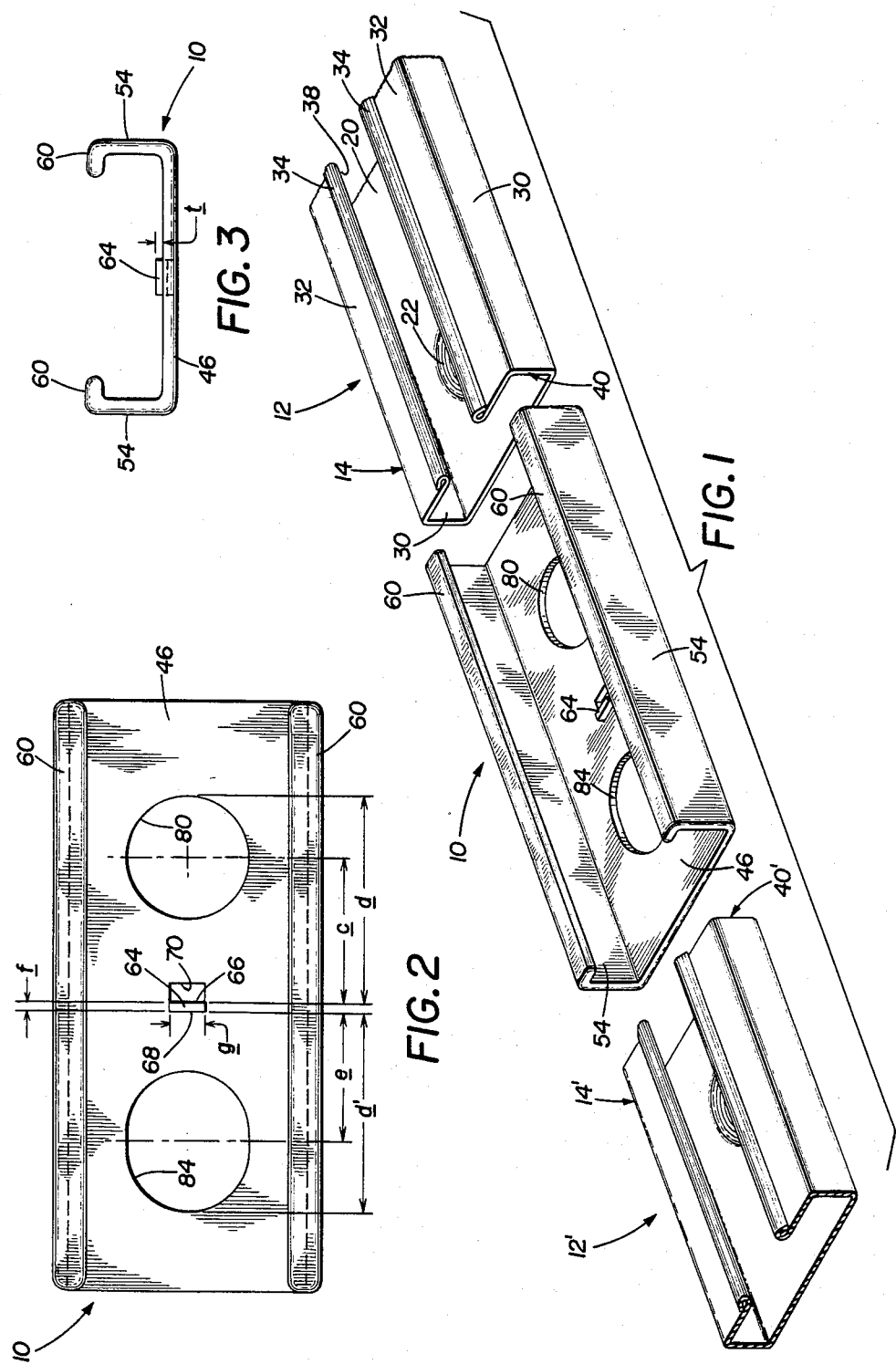

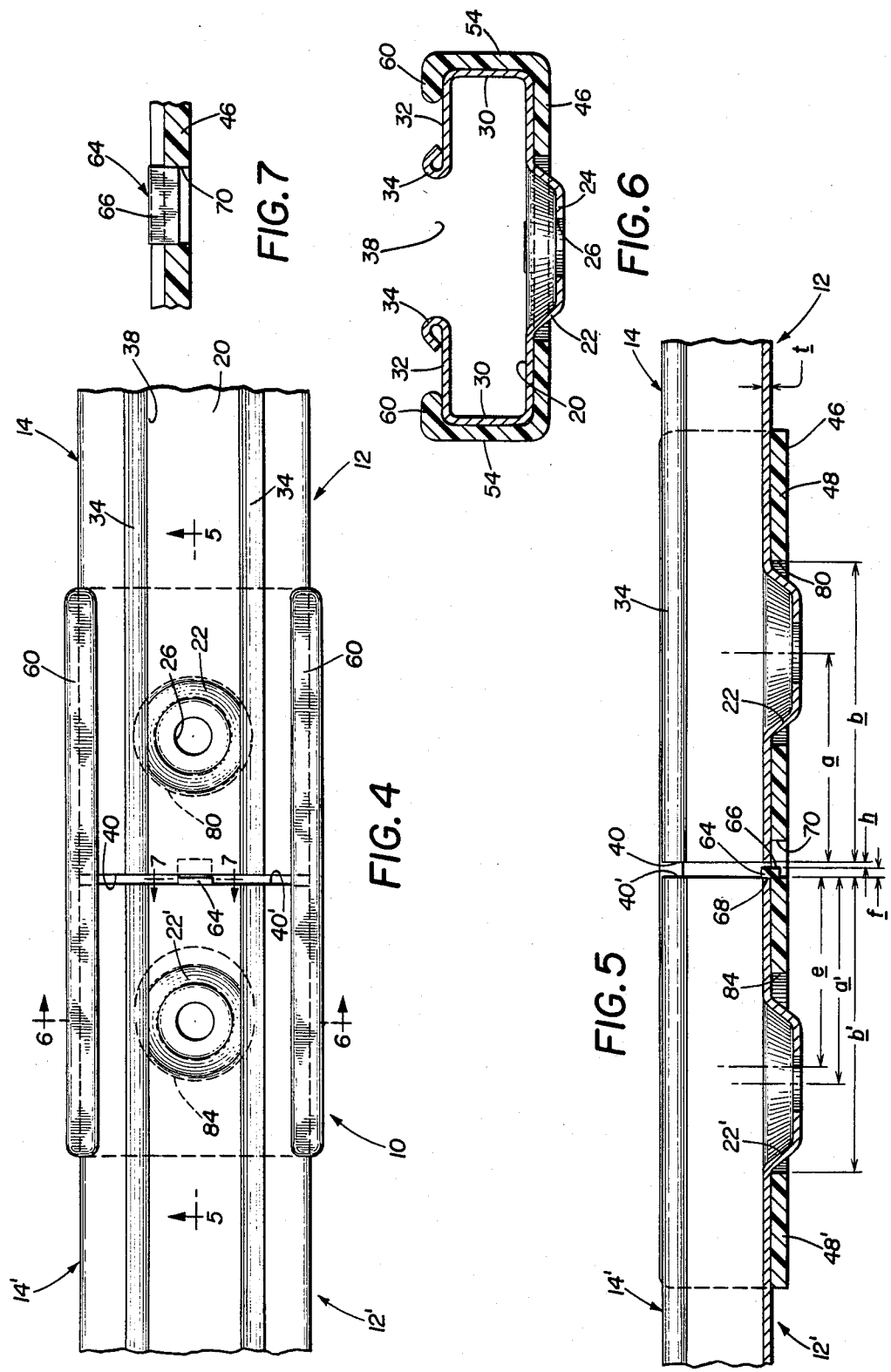

CHANNEL CONNECTOR

TECHNICAL FIELD

The field of art to which this invention pertains is that of mechanical fastening systems, particularly to channel connectors for channel members used in attachment devices for mechanically securing a flexible sheet, without puncturing same, within the channel members via either a flexible resilient insert member or a ductile rigid insert member, adapted for fixedly retaining the flexible sheet within the channel member.

BACKGROUND OF THE ART

Co-pending U.S. Application Ser. No. 516,622 to Yang, et al., filed July 25, 1983, and assigned to common assignee, dicloses a mechanical fastening system for securing a flexible sheet within a channel member via an insert member wherein the latter is made of a flexible resilient material having a central longitudinal flex notch that serves to define two adjacent wing portions and permits a temporary elastic deformation of the insert member into an inverted V-shape for insertion of the insert member, together with adjacent portions of the flexible sheet, into the channel member. In the interest of full disclosure, this application is incorporated herein by reference to the extent necessary to explain this particular mechanical fastening system.

Co-pending U.S. Application Ser. No. 516,618 to Yang, et al., filed July 25, 1983 and assigned to common assignee, discloses a further attachment device for securing flexible sheets within a channel member via an insert member of generally inverted V-shape wherein the latter is made of a ductile but rigid material having a central longitudinal material portion of reduced rigidity that serves to define two adjacent wing portions and permits the subsequent plastic deformation of the insert member into its installed shape after its insertion, together with adjacent portions of the flexible sheet, into the channel member. Again, in the interest of full disclosure, this application is incorporated herein by reference to the extent necessary to explain this particular attachment device.

In both the previously-noted mechanical fastening system and attachment device, preferably metallic channel members are utilized to produce long tracks, with these tracks having ends, which are either factory cuts or field end cuts. The channel members must initially be adhered to a substrate and the system, to a large extent, relies substantially on the skillfulness of a roofer for providing the proper vertical and horizontal alignment between succeeding channel members as well as providing adequate expansion gaps therebetween. This application method has proven both too time-consuming and too dependent upon individual skills. Misalignment during installation may cause occasional flexible sheet or membrane damage via cutting or tearing at channel ends. Pinching of the membrane between adjacent channel ends, due to inadequate expansion gaps therebetween, can also result in premature membrane failure.

DISCLOSURE OF THE INVENTION

The present invention provides a solution to the misalignment and inadequate spacing problems between succeeding channel members by utilizing a channel connector for physically connecting and spacing the adjacent end portions of a pair of succeeding channel members. The channel connector is comprised of a flexible resilient material of a generally rectangular form, in transverse cross section, and of a predetermined axial length, having bottom and sidewalls enveloping the corresponding adjacent walls of the channel members, with the channel member also having top walls enveloping at least the transverse outermost portions of the top walls of the channel members.

The channel connector of the present invention further includes transverse spacer means, having opposed first and second sides, on the bottom wall, intermediate the ends of the channel connector, wherein the spacer means preferably takes the form of a raised tang or tab whose transverse extent is substantially less than that of the channel connector bottom wall.

The channel connector bottom wall is provided with a first aperture of a size to physically retain a protrusion in the bottom wall of the channel member at a sufficient distance from the first side of the spacer means so as to prohibit it from making contact therewith.

The channel connector bottom wall is provided with a second aperture of a size greater than the protrusion in the bottom wall of the second channel member, this second aperture being centered a distance from the second side of the spacer means so that it cooperates with the protrusion of the second channel member to physically bias the second channel member axial outer end surface against the second side of the spacer means.

In a preferred embodiment of the channel connector of this invention, the first bottom wall aperture is substantially circular whereas the second aperture is substantially oval in shape, with the connector bottom wall being provided with a third aperture, bordering one of the sides of the tang, with this third aperture being of the size sufficient to permit the displacement thereinto of the tang as a result of the thermal expansion of the channel members. The physical alignment of adjacent ends of succeeding channel members, both horizontally and axially, as well as axially spacing the opposing channel member axial outer end surfaces from each other not only eliminates the cutting and tearing of the flexible membranes due to channel member misalignment, but also provides a predetermined space therebetween to allow for differential thermal expansion, and also reduces the time and individual skills required for installation.

Other features and advantages of the present invention will become more readily understood by persons skilled in the art when following the best mode description in conjunction with the several drawings.

BRIEF DESCRIPTION OF THE DRAWINGS

FIG. 1 is an exploded view, in perspective, of the channel connector of the present invention together with two channel members, in the unassembled condition.

FIG. 2 is a top plan view of the channel connector.

FIG. 3 is an end view of the channel connector.

FIG. 4 is a top plan view of the channel connector and the two channel members in the assembled condition.

FIG. 5 is an enlarged longitudinal sectional view taken on line 5—5 of FIG. 4.

FIG. 6 is an enlarged transverse sectional view taken on line 6—6 of FIG. 4.

FIG. 7 is an enlarged longitudinal fragmentary sectional view taken on line 7—7 of FIG. 4 showing the abutment means of the present invention.

BEST MODE FOR CARRYING OUT THE INVENTION

Referring now to the drawings, specifically FIG. 1, there is illustrated in an exploded view, in perspective, the channel connector 10 of the present invention which is designed to fit over and substantially envelop end portions 14 and 14' of axially aligned but spaced first and second channel members 12 and 12', respectively, in a manner to be described hereinafter.

Only one channel member will be described since channel members 12, 12' are substantially similar. Channel member 12, as best seen in FIGS. 1 and 6 and usually of a rigid, preferably metal construction of finite length and predetermined material thickness t (FIG. 5), is of generally rectangular form in transverse cross section (see FIG. 6) having a substantially flat bottom wall 20, which in turn may be provided with a plurality (one shown) of longitudinally spaced outwardly directed protrusions or recesses 22 each provided with a bottom wall 24 having a central aperture 26, the latter permitting the passage therethrough of the body portion of a fastener (not shown). The ends of channel bottom wall 20 merge into opposed, similarly projecting parallel sidewalls 30, which in turn merge into inwardly directed and converging spaced top walls 32, parallel to and equally spaced from bottom wall 20, whose inner but spaced smooth and opposed turned-over edge portions 34, serve to define a constricted central longitudinal slot or opening 38. The axial outer end surface of channel member 12, as defined by the axial outer end surfaces of walls 20, 30, 32 and edge portions 34 is denominated by numeral 40. Protrusions 22 are of a predetermined common diameter and spaced a predetermined distance from each other (not shown) and centered a predetermined distance a (FIG. 5) from channel axial end surface 40.

Turning now to channel connector 10, as best seen in FIGS. 1, 2 and 3, it is preferably constructed of a flexible resilient material such as for example, a polyproylene copolymer, but other plastic, elastomeric or rubber-type materials can also be utilized. Channel connector 10 is also of generally rectangular form, in transverse cross section, and with the exception of its top walls, substantially complementary with that of channel member 12, as best seen in FIG. 6. Channel connector 10 has a predetermined axial extent or length preferably at least twice that of the transverse extent of channel member 12 and a substantially flat bottom wall 46 of predetermined thickness and complementary with channel member bottom wall 20. The transverse ends of bottom wall 46 merge into opposed similarly upwardly projecting parallel side walls 54, complementary with channel side walls 30, with side walls 54 in turn merging into inwardly converging spaced top walls 60 parallel to and equally spaced from bottom wall 46. While complementary in shape with channel member top walls 32, the transverse extent of top walls 60 may be substantially less than that of channel member top walls 32. Connector top walls 60, however, extends sufficiently in the transverse direction to securely envelop channel member side walls 30 and permit the sliding movement of channel connector 10 relative to channel members 12 to permit the assembly thereof in the manner depicted in FIG. 4.

Bottom wall 46, preferably near the center of its axial extent, is provided with spacer means 64 which preferably takes the form of a transversely extending raised tab or tang having a height t, a width f and a transverse extent g, the latter preferably being substantially less than the width of bottom wall 46. Channel connector bottom wall 46 is also provided with a first generally circular aperture opening 80 axially spaced from one side 66 of spacer means 64. The predetermined diameter of aperture 80 is at least as great as, or preferably slightly greater than, that of channel member protrusion 22 so that aperture 80 is able to physically retain channel member protrusion 22. Furthermore, the distance c from the center of aperture 80 to facing wall portion 66 of spacer means 64 (FIG. 2) is slightly greater than distance a, i.e., the distance from the center of channel member protrusion 22 to channel axial end surface 40 (FIG. 5). Similarly, distance d, namely the distance from spacer wall portion 66 to the axially outermost portion of the wall defining aperture 80 (FIG. 2), is also slightly greater than distance b, namely the distance from the axial most rearward portion of channel member protrusion 22 to channel member end surface 40 (FIG. 5). In practice, therefore, the assembly of channel member 12 with that portion of channel connector 10 having aperture 80, (as best seen in FIGS. 4 and 5) thus leaves a slight space h between channel member end surface 40 and spacer wall portion 66, i.e., there is no abutment.

Channel connector bottom wall 46 is provided with a second aperture or opening 84, preferably elongated or oval in shape, whose minor or transverse dimension is similar to the diameter of aperture 80, but whose major or axial dimension is greater than the diameter of aperture 80. As best seen in FIG. 5, the distance e from the center of aperture 84 to facing wall surface 68 of spacer means 64 is less than the distance a' from the center of channel member protrusion 22' to channel member axial end surface 40'. Furthermore, the distance d' (FIG. 2), i.e., the distance from the axially outermost portion of the wall defining aperture 84 to spacer means wall portion 68 is preferably slightly less than the distance b' (FIG. 5) namely the spacing from the axially most rearward portion of protrusion 22' to channel connector axial end surface 40'. Thus, due to the slight interference or press fit resulting from the fitment of channel end portion 14' relative to channel connector 10, the axial rearward portion of protrusion 22' makes physical contact with the axial rearward wall portion defining aperture 84 thus physically biasing channel member end surface 40' into contact with spacer means wall surface 68. This is best seen in FIG. 5 which also shows that, due to the oval extent of aperture 84, channel members 12' is axially movable in the inward direction, i.e., toward opposing channel member 12 although such movement will cause the displacement of spacer means 64 via elastic deformation. Such displacement of channel member 12' may occur as a result of thermal expansion, with the height, width and thickness of spacer means 64 being such as to permit such deformation. In order to enhance the displacement of spacer means 64, bottom wall 46 may be provided with an aperture 70 adjacent spacer side wall 66, with aperture 70 being of sufficient width and length that spacer means 64 may be displaced thereinto. The inherent elasticity of channel connector 10 also permits a slip-fit assembly with channel members 12, 12', with channel connector bottom wall portions 48, 48', e.g., the portions of bottom walls 46, 46' axially outwardly of apertures 80 and 84, respectively, deforming sufficiently to permit the passage thereover of channel member protrusions 22 and 22', respectively.

As previously noted, the transverse extent or width of channel connector top walls 60 may be substantially less than those of channel member top walls 32. This permits, in addition to the sliding assembly already described, the snap-type of assembly of channel members 12, 12' relative to channel connector 10. Initially, one channel member side wall 30 and portion of its top wall 32 are placed under one channel connector top wall 60 followed by the application of a downward force on the remaining connector top wall 60 thereby elastically deforming the opposing channel connector side wall 54 thus permitting channel member 12 or 12' to snap into channel connector 10.

From the previous description it should be clear that the assembly of channel connector 10 relative to channel member end portions 14, 14' merely entails sliding the one relative to the other after first axially aligning same in the manner shown in FIG. 1 or snap-fitting same in the manner previously described.

The channel connector of the present invention finds specific utility in mechanical fastening systems utilized for securing EPDM sheeting in roofing applications. However, from the foregoing description, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. The combination of a channel connector for physically connecting and spacing the adjacent end portions of a pair of first and second axially aligned substantially similar channel members, each of said channel member being of generally rectangular form, in transverse cross section, having a substantially flat bottom wall, similarly projecting side walls, and top walls parallel to said bottom wall, said top walls having contoured inner edges separated by a continuous central longitudinal slot, each of said channel members further including an outwardly directed protrusion centered a first distance from the channel member axial outer end surface and having a first dimension, said channel connector being comprised of a flexible resilient material of a generally rectangular form, in transverse cross section, and of a predetermined axial extent having:
   (a) bottom and side walls enveloping the corresponding adjacent walls of said channel members, said channel connector also having top walls enveloping at least the transverse outermost portions of the top walls of said channel members;
   (b) transverse spacer means, having opposed first and second sides, on said bottom wall, intermediate the ends of said channel connector;
   (c) said channel connector bottom wall having a first aperture of a dimension so as to permit the physical retention of the channel member protrusion of the first of said channel members, said first aperture being centered a distance, from the first side of said spacer means, greater than said first distance of said first channel member; and
   (d) said channel connector bottom wall having a second aperture of a dimension greater than the first dimension of the protrusion of the second of said channel members, said second aperture being centered a distance from the second side of said spacer means less than the first distance of said second channel member, said second aperture cooperating with the protrusion of said second channel member so as to physically bias said second channel member axial outer end surface against the second side of said spacer means.

2. The combination of claim 1 wherein said spacer means takes the form of a raised tang or tab whose transverse extent is substantially less than that of said bottom wall.

3. The combination of claim 2 wherein said bottom wall has a third aperture bordering one of said sides of said tang or tab, said third aperture being of a size sufficient to permit the displacement thereinto of said spacer means.

4. The combination of claim 1 wherein said first dimension of said first channel member protrusion is of a first diameter and the dimension of said channel connector bottom wall first aperture is of a further diameter, with said further diameter being at least as great as said first diameter.

5. The combination of claim 1 wherein said first dimension of said second channel member protrusion is of a first diameter and said channel connector bottom wall second aperture is substantially oval in shape whose minor axis is of a length approximate that of said first diameter while its major axis is of a length greater than that of said first diameter, thus permitting relative sliding axial movement between said second channel member and said channel connector.

6. The combination of claim 1 wherein the axial extent of said channel connector top walls envelops all but the contoured inner edges of said channel member top walls.

7. A channel connector comprised of a flexible resilient material, of a generally rectangular form in a transverse cross section, of a predetermined axial extent having:
   (a) a substantially flat bottom wall, similarly projecting side walls, and top walls parallel to said bottom wall, said top walls being separated by a continuous central longitudinal slot;
   (b) transverse spacer means, having opposed transversely extending sides, on said bottom wall, at about the midpoint of said channel connector axial extent;
   (c) said bottom wall having a first aperture of a first predetermined size and shape centered a first predetermined axial distance from one of said spacer means sides; and
   (d) said bottom wall having a second aperture of a second predetermined size and shape centered a second predetermined axial distance from the other of said spacer means sides said second aperture shape differeing from said first aperture shape.

8. The channel connector of claim 7 wherein the transverse extent of said spacer means is substantially less than the transverse extent of said bottom wall.

9. The channel connector of claim 8 wherein said bottom wall has a third aperture bordering one of said sides of said spacer means, said third aperture being of a size sufficient to permit the displacement, via elastic deformation, of said spacer means thereinto.

10. The channel connector of claim 7 wherein its axial extent is at least twice its transverse extent.

11. The channel connector of claim 7 wherein said first aperture is substantially circular.

12. The channel connector of claim 7 wherein said second aperture is substantially oval in shape and whose major axis coincides with that of said bottom wall.

* * * * *